US 8,504,982 B2

(12) United States Patent
Joe et al.

(10) Patent No.: US 8,504,982 B2
(45) Date of Patent: Aug. 6, 2013

(54) DECLARATIVE ASPECTS AND ASPECT CONTAINERS FOR APPLICATION DEVELOPMENT

(75) Inventors: Matthew D. Joe, Issaquah, WA (US); Paul C. Currit, Issaquah, WA (US); Minn Thein, Issaquah, WA (US); Sumit Chawla, Bothell, WA (US); David Mainer, Seattle, WA (US); Stephen J. Maine, Seattle, WA (US); Christopher Chang, Redmond, WA (US); Mei Yuei Lee, Redmond, WA (US); Kyle F. Huntley, Lake Forest Park, WA (US); Karel Deman, London (GB); Blake M. Dong, Rowland Heights, CA (US)

(73) Assignee: Avanade Holdings LLC, Seattle, WA (US)

( * ) Notice: Subject to any disclaimer, the term of this patent is extended or adjusted under 35 U.S.C. 154(b) by 645 days.

(21) Appl. No.: 12/651,971

(22) Filed: Jan. 4, 2010

(65) Prior Publication Data

US 2010/0229154 A1    Sep. 9, 2010

Related U.S. Application Data

(63) Continuation of application No. 11/000,351, filed on Nov. 30, 2004, now abandoned.

(51) Int. Cl.
G06F 9/44 (2006.01)
(52) U.S. Cl.
USPC .............................. 717/107; 717/114; 717/116
(58) Field of Classification Search
None
See application file for complete search history.

(56) References Cited

U.S. PATENT DOCUMENTS

| 6,694,513 | B1 | 2/2004 | Andersson et al. | |
|---|---|---|---|---|
| 6,907,546 | B1 | 6/2005 | Haswell et al. | |
| 6,973,455 | B1 | 12/2005 | Vahalia et al. | |
| 7,277,951 | B2 | 10/2007 | Marriott et al. | |
| 7,328,282 | B2 | 2/2008 | Ganesan et al. | |
| 7,395,524 | B2 * | 7/2008 | Roesner et al. | 717/114 |
| 7,444,618 | B2 * | 10/2008 | Kulkarni et al. | 717/114 |
| 7,617,481 | B2 | 11/2009 | Joe et al. | |
| 7,747,980 | B2 * | 6/2010 | Illowsky et al. | 717/107 |
| 7,774,752 | B2 * | 8/2010 | Irving et al. | 717/116 |
| 7,840,937 | B1 * | 11/2010 | Chiluvuri | 717/107 |

(Continued)

OTHER PUBLICATIONS

Huaxi Zhang et al.; A Three-level Component Model in Component Based Software Development; [Sep. 2012] retrieved online on Mar. 21, 2013; pp. 1-10; Retrieved from the Internet: <URL: http://delivery.acm.org/10.1145/2380000/2371412/p70-zhang.pdf?>.*

(Continued)

*Primary Examiner* — Thuy Dao
*Assistant Examiner* — Hanh T Bui
(74) *Attorney, Agent, or Firm* — Christensen O'Connor Johnson Kindnes PLLC

(57) ABSTRACT

An aspect container being operable to generate an instance of itself at run time is provided. The aspect container comprises logic operable to create an instance of the aspect container by reading configuration information specifying a sequence of one or more aspects from an aspect container configuration file corresponding to the aspect container. The logic is also operable to generate instances of the aspects in the sequence, configure each aspect instance with its configuration information from an aspect configuration file corresponding to the aspect, and chain the aspect instances according to the specified sequence, such that the chain of aspect instances preamble and postamble activities of a class or method.

33 Claims, 11 Drawing Sheets

U.S. PATENT DOCUMENTS

| | | | | |
|---|---|---|---|---|
| 7,844,947 | B2* | 11/2010 | Irving et al. | 717/107 |
| 7,890,929 | B1* | 2/2011 | Johanson | 717/116 |
| 7,958,488 | B2* | 6/2011 | Cifra | 717/106 |
| 8,028,273 | B2* | 9/2011 | Roesner et al. | 717/114 |
| 8,196,093 | B2* | 6/2012 | Son et al. | 717/107 |
| 8,336,022 | B2* | 12/2012 | Turner et al. | 717/107 |
| 8,375,354 | B2* | 2/2013 | Shenfield et al. | 717/107 |
| 8,392,877 | B1* | 3/2013 | Chiluvuri | 717/107 |
| 2004/0031015 | A1* | 2/2004 | Ben-Romdhane et al. | 717/107 |
| 2004/0187093 | A1* | 9/2004 | Hogan | 717/114 |
| 2006/0075382 | A1* | 4/2006 | Shaburov | 717/106 |
| 2006/0117009 | A1 | 6/2006 | Joe et al. | |
| 2006/0225032 | A1* | 10/2006 | Klerk et al. | 717/105 |
| 2008/0098351 | A1* | 4/2008 | Weatherhead et al. | 717/107 |
| 2008/0301629 | A1* | 12/2008 | Stark | 717/107 |
| 2008/0313605 | A1* | 12/2008 | Sandy | 717/107 |
| 2009/0249288 | A1* | 10/2009 | Jin et al. | 717/107 |
| 2010/0229154 | A1* | 9/2010 | Joe et al. | 717/107 |
| 2010/0318961 | A1* | 12/2010 | Khoruzhenko et al. | 717/107 |
| 2010/0318962 | A1* | 12/2010 | Jones et al. | 717/107 |

OTHER PUBLICATIONS

Sergei Kojarski and David H. Lorenz; Modeling Aspect Mechanisms: A Top-Down Approach; [May 2006] retrieved online on Mar. 21, 2013; pp. 1-10; Retrieved from the Internet: <URL: http://delivery.acm.org/10.1145/1140000/1134316/p212-kojarski.pdf?>.*

Serguei Roubtsov et al.; Reverse Engineering Sequence Diagrams from Enterprise Java Beans with Interceptors; [2011] retrieved online on Mar. 21, 2013; pp. 1-10; Retrieved from the Internet: <URL: http://ieeexplore.ieee.org/stamp/stamp.jsp?tp=&arnumber=6065174>.*

".NET Framework Developer's Guide .NET Remoting Overview," Microsoft Corporation, 2005, http://msdn.microsoft.com/library/enus/cpguide/html/cpconnetremotingoverview.asp?frame=true, accessed May 4, 2005, 2 pages.

"Avanade ACA.NET Introducing ACA.NET," Avanade, Inc., 2001-2003, 15 pages.

"Avanade ACA.NET™ 2.2 Getting Assistance," Avanade, Inc., 2001-2003, 1 page.

"Avanade ACA.NET™ 2.2 Installation and Setup," Avanade, Inc., 2001-2003, 5 pages.

"Features Overview," Microsoft Corporation, 2005, http://msdn.microsoft.com/netframework/technologyinfo/features/default.aspx, accessed May 4, 2005, 4 pages.

"Microsoft Windows CE .NET 4.2 About Platform Builder," Microsoft Corporation, 1992-2003, http://msdn.microsoft.com/library.enus/wcepb40/html/pboriUsingPlatformBuilder.asp?frame=true accessed May 4, 2005, 2 pages.

"Product Information for Visual Studio .NET 2003," Microsoft Corporation, 2005, http://msdn.microsoft.com/vstudio/productinfo/default.aspx, accessed May 4, 2005, 3 pages.

Gamma, Erich, et al., "Design Patterns, Elements of Reusable Object-Oriented Software," Addison-Wesley Publishing Company, Holland, 1994, cover, Contents pages, copyright page.

European Search Report, European Application No. EP05257243, Applicant: Avanade Holdings LLC., search completed Nov. 21, 2007, 1 page.

Laddad, R. "I Want my AOP! Part 2 Learn Aspectj to Better Understand Aspect-Oriented Programming," Java World Publication http://www.javaworld.com/javaworld/jw-03-2002/jw-0301-aspect2.html, San Francisco, CA., Mar. 1, 2002, 12 pages.

Kiczales et al., "An Overview of Aspectj" Lecture Notes in Computer Science, Springer, Berlin, vol. 2072, copyright 2001, 28 pages.

* cited by examiner

508 —— using XYZ.ACA.Services

510 —— [AcaService]

512 —— [AsmxTransport]

514 —— [WseTransport]

502 —— public CalculatorService
{

516 —— [AcaServiceMethod]

504 —— public int Add (int arg1, int arg2)
{

506 ——   return arg1 + arg2;
}
}

*FIG. 5*

508 —— using XYZ.ACA.Services;

510 —— [AcaService]

512 —— [AsmxTransport]

514 —— [WseTransport]

502 —— public CalculatorService
{

516 —— [AcaServiceMethod]

602 —— [AspectContainer ("CalcContainer", AspectContainerScope.SendersOnly)]

504 —— public int Add (int arg1, int arg2)
{

506 ——   return arg1 + arg2;
}
}

*FIG. 6*

```
            . . .
         [AcaService]
702 ──── [AspectContainer ("Container1")]
704 ──── public class MyClass
         {
            . . .
         [AcaServiceMethod]
706 ────    [AspectContainer ("Container2")]
            public string GetMyData (int UserId)
            {
               . . .
            }
            . . .
         }
```

*FIG. 7*

DECLARATIVE ASPECTS AND ASPECT CONTAINERS FOR APPLICATION DEVELOPMENT

CROSS REFERENCE TO RELATED APPLICATION

This application is a continuation of U.S. application Ser. No. 11/000,351, entitled "DECLARATIVE ASPECTS AND ASPECT CONTAINERS FOR APPLICATION DEVELOPMENT," filed Nov. 30, 2004, the entirety of which application is incorporated by reference herein.

TECHNICAL FIELD

The described technology is directed generally to application development and, more particularly, to an architecture for application development.

BACKGROUND

There is a current trend in software design toward modeling and delivering software logic and applications as services. With the growth of the Internet, and in particular, the maturing of the World Wide Web ("Web"), application developers are increasingly delivering these services as Web services.

As an example, an application developer may need to write some business logic and may want to package up the business logic in a way to expose it as a Web service. Typically, the developer will have to define an interface with the necessary input data, and will also have to define the output. The developer then writes the business logic that does some amount of work using the designed input and which creates the output. In addition to writing the business logic, the developer will also have to write logic for ancillary requirements to the business logic, such as auditing, security, error handling, caching, etc.

For example, the service may need to cache the output value. In order to properly incorporate this feature into the service, the developer will have to (1) check the value of the outputs, (2) create a kind of key based on those values, (3) match the key with a possible value in the cache and return the value if there is a match, otherwise proceed to the service logic to create the output value, and (4) add it to the cache before returning it back to the caller. The developer will need to design and implement other attributes of the cache, such as a strategy for expiring an item in the cache, a strategy for notification in the instance an item in the cache is expired, etc.

The developer will need to perform a similar task for each of the ancillary requirements. Additionally, because Web services typically communicate over a network, the developer will need to design and code the communication infrastructure for the service. Developing and delivering a large number of services in this manner can get tedious, especially given the fact that the ancillary requirements and the communication infrastructure do not contribute to the business logic. Further, the cost and complexity of implementing the Web services is increasingly becoming prohibitive, particularly for small to medium sized organizations.

One reason for this is that while the business logic generally does not change, the underlying and ancillary technologies are very likely to change over time. Presently, numerous standards that address various aspects of Web services are evolving and/or being developed. Because the Web services typically include the ancillary logic, the Web services and, particularly, the ancillary logic will have to be modified and enhanced as these standards evolve and develop in order to take advantage of the standards.

BRIEF DESCRIPTION OF THE DRAWINGS

FIG. 5 illustrates an example code snippet of a calculator application containing service deployment metadata.

FIG. 6 illustrates the example code snippet of FIG. 5 further containing an aspect container attribute.

FIG. 7 illustrates an example code snippet illustrating both a class level and a method level aspect container deployment.

DETAILED DESCRIPTION

Figure 1:
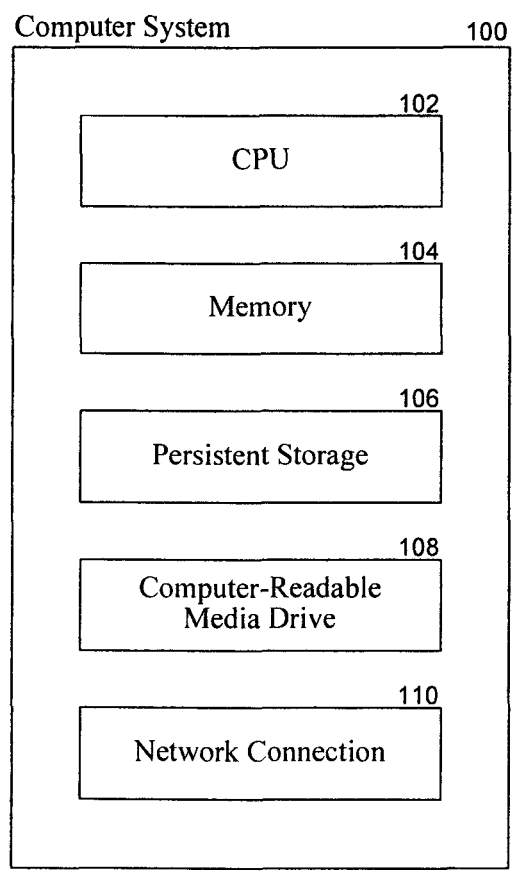
FIG. 1 is a block diagram illustrating selected components typically incorporated in at least some computer systems on which a facility describe below executes.

The invention will now be described with respect to various embodiments. The following description provides specific details for a thorough understanding of, and enabling description for, these embodiments of the invention. However, one skilled in the art will understand that the invention may be practiced without these details. In other instances, well-known structures and functions have not been shown or described in detail to avoid unnecessarily obscuring the description of the embodiments of the invention.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

In general, brief definitions of several terms used herein are preceded by the term being enclosed within double quotation marks. Such definitions, although brief, will help those skilled in the relevant art to more fully appreciate aspects of the invention based on the detailed description provided herein. Such definitions are further defined by the description of the invention as a whole (including the claims) and not simply by such definitions.

Before describing the details of the current invention, some terminology used herein is described.

The term "aspects" generally refers to functional areas that are 'cross cutting' or apply uniformly across a variety of usage instances. Aspects are 'orthogonal' to the application code and may include functionality such as, by way of example, auditing, instrumentation, security, caching, exception handling, validation, etc.

The term "aspect container" generally refers to a unit of aspect deployment. The aspect container organizes and coordinates the aspects, and is used to attach aspects to any class or method. In some embodiments, an aspect container deployed at the class level governs all exposed methods on the class, unless overridden by a method-level aspect container—e.g., another aspect container deployed on the method.

The term "assembly" generally refers to a collection of types and resources that are built to work together and form a logical unit of functionality. In .NET, an assembly provides the common language runtime with the information it needs to be aware of type implementations. To the common language runtime, a type does not exist outside the context of an assembly.

The term "messages" generally refers to structured information exchanged between two services.

The term "plumbing" generally refers to serializing data as XML, transporting the data using HTTP, and de-serializing the XML back to meaningful data.

The term "receiver" generally refers to an incoming pipe, and is generated entirely from a service definition. In some embodiments, the receiver is plumbing.

The term "sender" generally refers to an outgoing pipe, and is generated entirely from a service definition. In some embodiments, the sender is plumbing.

The term "services" generally refers to the delivery of functionality by exchanging messages over transports. Services contain the actual business logic—i.e., the custom code—and are responsible for performing business logic, interacting with the data, coordinating other services, etc.

The term "transports" generally refers to message exchange or communication technologies that allow services to communicate.

The term "types" generally refers to the data types specified by programming languages to store different kinds of data.

Various embodiments of the invention provide a software facility for building software applications ("the facility"). The facility is comprised of reusable architecture components that provide valuable services and assistance to developers who are building the applications. For example, the facility enables the developer to build applications that can be deployed faster, with better quality and increased agility.

Although the various embodiments of the invention will be described as a compliment and extension of the Microsoft® .NET Framework, including terminology similar to that used in .NET, the description is merely illustrative and not limiting. As such, it will be appreciated that the various components of the facility, including the various features, can be adapted to compliment and extend other application development and deployment platforms. In addition, while the invention is described herein with respect to the development and deployment of services, those skilled in the art will appreciate that the facility can be adapted to facilitate the development and deployment of applications and application programs in general.

In some embodiments, a service developer that wants to package up an application as a service creates the actual business logic for the service. The service developer then enhances the business logic with service deployment metadata to define the service's associated senders and receivers. The service developer then utilizes the facility to wholly generate the senders and receivers from the service deployment metadata specified in the business logic. Senders and receivers typically come in pairs and create an extensible architecture to hide details of the underlying transports. The senders and receivers thus provide a mechanism to protect the applications—i.e., business logic—from rapidly changing messaging standards.

Optionally, the service developer can attach one or more aspect containers on the business logic. In one embodiment, an aspect container is used to attach aspects to any class or method. The aspect container organizes and coordinates the aspects and is used to build a managed chain of responsibility to 'preamble' and 'postamble' the activities of the application—e.g., class or method. In operation, each aspect in the aspect container has a chance to exercise itself both before and after the call to the class or method. The application of the aspect container generates a sequence of aspects, where the order of the aspects and their respective internal states are retrieved from their respective configuration data.

In some embodiments, aspect containers may be attached to a sender, a receiver, or both the sender and receiver. Moreover, aspect containers can be applied mix-and-match to any service element—i.e., sender or receiver. In operation, if a method call has been attributed with an aspect container containing an aspect or a chain of aspects, the aspect or chain of aspects function to 'intercept' the method call the client code is targeting. Once intercepted, the aspect or chain of aspects obtains the target method call information, and the aspects each execute in sequence. After executing in sequence, the 'real' or intercepted method—i.e., the transport code if attached to the sender, or the actual business logic if attached to the receiver—executes, and then each aspect executes in reverse sequence. Thus, the aspects provide the service developer a declarative way to control many facets of application behavior, and serve as an effective shield to changes in underlying functionality, such as Web services, and to reduce the amount of new custom code required to generate the service. Another benefit provided by the aspects is that application architecture functionality that is not fundamental to the service and service transports can be applied at deployment or run-time through configuration.

Separate from the application development, the service developer, service architect, or other knowledgeable person, utilizes the facility to define the aspect containers that are made available for attachment to the business logic. In one embodiment, each aspect container is different from the others only in the name of the aspect container that is provided. A configuration file having the same name as the name of the aspect container contains the actual definition of the contents of the aspect container, and the particular configuration of each aspect in the aspect container is expressed in a respective aspect configuration file, such as, by way of example, an XML file. The aspect container contains logic to read the contents of its corresponding configuration file—e.g., as provided by the name of the aspect container—and to use the information in the configuration file to populate itself—i.e., create an instance of the aspect container containing instances of the aspects.

Having created the actual business logic, decorated the business logic with the service deployment metadata, and optionally attached one or more aspect containers on the business logic, the service developer uses the facility to compile the business logic. As a result of the compile operation and depending on the specified service deployment metadata, the facility outputs three assemblies: a service sender; a service receiver; and a contracts assembly containing the custom types used by the service. The service developer deploys the assemblies into an execution environment for consumption and service publishing. For example, the execution environment may comprise one or more clients and one or more servers. Here, the sender can be deployed to some or all of the clients, and the receiver and the business logic—i.e., the service—can be deployed to some or all of the servers. If the service developer added functionality to the client—i.e., sender—side by attaching one or more aspect containers, the appropriate configuration file for each aspect container, and the configuration files for the aspects specified by the aspect container, are also deployed into the execution environment, in this instance, the client, in order that the aspect containers can be populated and their contents cached on the client during execution of the sender.

Once the service is deployed into the execution environment, the service becomes available for consumption. A service consumer wanting to consume a specific service references the desired service sender in the client code. The referenced service sender functions as a 'proxy' for the actual service and encapsulates the details of the transport specific code. Because the service sender encapsulates the transport specific code, the client code is able to simply request an instance of the service without having to worry about transport-level details. In other embodiments, a service consumer may consume a service without using the provided service sender. In this instance, the service consumer needs to format the service request in the client code in the message format the service expects, which typically requires writing additional code specifically for the service technology. In one embodiment, the service request is formatted using standard Service Oriented Architecture Protocols (SOAP).

The various embodiments of the facility and its advantages are best understood by referring to FIGS. 1-12. The elements of the drawings are not necessarily to scale, emphasis instead being placed upon clearly illustrating the principles of the invention. Throughout the drawings, like numerals are used for like and corresponding parts of the various drawings.

FIG. 1 is a block diagram illustrating selected components typically incorporated in at least some of the computer systems on which the facility executes. These computer systems 100 may include one or more central processing units ("CPUs") 102 for executing computer programs; a computer memory 104 for storing programs and data—including data structures—while they are being used; a persistent storage device 106, such as a hard drive, for persistently storing programs and data; a computer-readable media drive 108, such as a CD-ROM drive, for reading programs and data stored on a computer-readable medium; and a network connection 110 for connecting the computer system to other computer systems, such as via the Internet, to exchange programs and/or data—including data structures.

The facility may be described in the general context of computer-readable instructions, such as program modules, executed by computer systems 100 or other devices. Generally, program modules include routines, programs, objects, components, data structures, etc. that perform particular tasks or implement particular abstract data types. Memory 104 and persistent storage device 106 are computer-readable media that may contain instructions that implement the facility. It will be appreciated that memory 104 and persistent storage 106 may have various other contents in addition to the instructions that implement the facility.

It will be appreciated that computer systems 100 may include one or more display devices for displaying program output, such as video monitors or LCD panels, and one or more input devices for receiving user input, such as keyboards, microphones, or pointing devices such as a mouse. While computer systems 100 configured as described above are typically used to support the operation of the facility, it will be appreciated that the facility may be implemented using devices of various types and configurations, and having various components.

In the discussion that follows, embodiments of facility are described in conjunction with a variety of illustrative examples. It will be appreciated that the embodiments of facility may be used in circumstances that diverge significantly from these examples in various respects.

Figure 2:
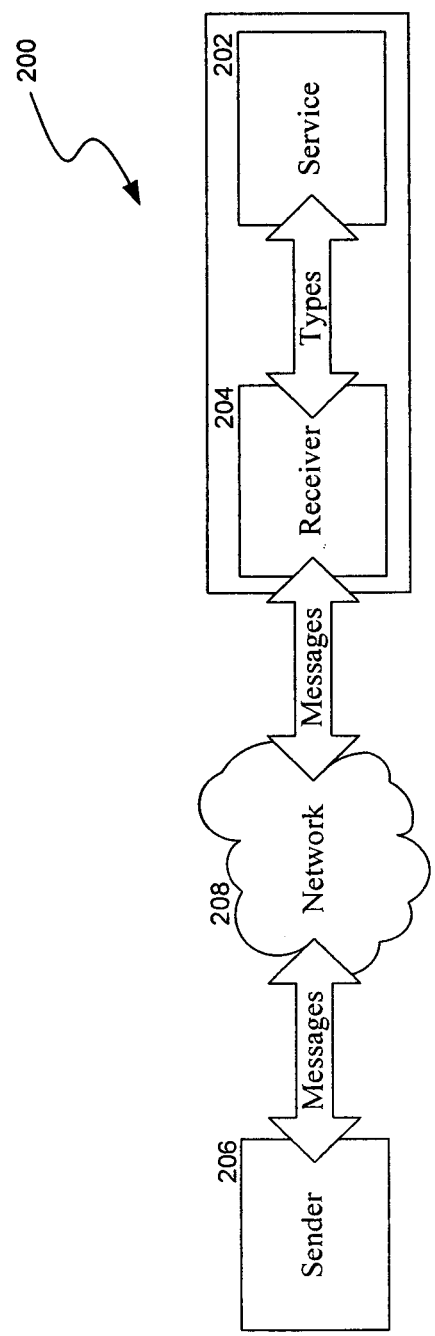
FIG. 2 is a high-level block diagram showing an environment in which components generated by the facility operate.

FIG. 2 is a high-level block diagram showing an environment 20 in which components generated by the facility operate. In general terms, environment 20 provides a service architecture, which abstracts the infrastructure details of individual messaging technologies from the business logic. The service architecture infrastructure takes care of generating the code necessary to enable an application to exchange messages, thus enabling service implementers to concentrate on delivering business functionality. As depicted, environment 20 comprises a service 202, a receiver 204, and a sender 206. In particular, receiver 204 and sender 206 are coupled through a network 208. As used herein, the terms "connected," "coupled," or any variant thereof, means any connection or coupling, either direct or indirect, between two or more elements; the coupling of connection between the elements can be physical, logical, or a combination thereof.

Service 202 generally functions to deliver functionality by exchanging messages over transports, which support asynchronous invocation of services 202. Service 202 contains the actual business logic. As such, service 202 is custom code and is responsible for actions such as performing the contained business logic, interacting with the data, and coordinating other services. In one embodiment, service 202 is decorated with service deployment metadata, which defines their associated senders and receivers. For example, a service developer adds the metadata to the business logic without modifying the actual business logic. The metadata is expressed as attributes on elements in the actual source code.

Receiver 204 generally functions as a transport suitable for receiving messages, and also functions to convert the received messages into types, and pass the types to its corresponding service 202 for processing. In this regard, receiver 204 facilitates plumbing. Receiver 204 is generated entirely by the facility from the service definition—i.e., service deployment metadata—specified in a corresponding service 202. In one embodiment, the facility reads as input the service deployment metadata contained in service 202 and generates (1) the communications logic necessary to implement the message exchange technology to enable receiver 204 to function as a transport suitable for receiving messages, (2) the logic necessary to convert the messages into types, and (3) the logic necessary to pass the types to the appropriate service 202. Examples of message exchange technologies include communication technologies such as in-process transport, which exposes the service functionality as an in-memory object; Microsoft® .NET Remoting transport, which exposes the service functionality as a server-activated, single call object using .NET Remoting stack; Microsoft® ASP.NET Web Services (ASMX) transport, which exposes the service functionality as an ASP.NET endpoint; Web Service Enhancements for Microsoft® .NET (WSE)2.0 transport, which exposes the service functionality securely over TCP and HTTP; and other readily-available and suitable transports. A technical advantage is that receiver 204, by being wholly generated by the facility, allows the service developer to be transport neutral—i.e., the service developer does not have to develop the custom communications code.

Sender 206 generally functions as a proxy for its corresponding service 202. As such, sender 206 converts types into messages and also functions as a transport mechanism suitable for sending the messages to its corresponding receiver 204. In this regard, sender 206 facilitates plumbing. Sender 206 is generated entirely by the facility from the service definition—i.e., service deployment metadata—specified in its corresponding service 202. In one embodiment, the facility reads as input the service deployment metadata contained in service 202 and generates (1) the logic necessary to present service 202 as a proxy, (2) the logic necessary to convert the types into messages, and (3) the communications logic necessary to implement the message exchange technology to enable sender 206 to function as a transport suitable for sending messages.

One technical advantage is that sender 206 makes it easy to drop messages into the communications pipe to its corresponding receiver 204, and ultimately to service 202. Another technical advantage is that sender 202 preserves type fidelity across the messaging boundary, if desired. A further technical advantage is that sender 206, by being wholly generated by the facility, allows the service consumer to be transport neutral—i.e., the service consumer does not have to develop the custom communications code.

One skilled in the art will appreciate that senders 206 are not required to communicate with receivers 204. In this instance, services 202 can be consumed by any application that supports and is able to use the messaging technology. Stated another way, the application developer will need to develop and incorporate the functionality provided by the senders—e.g., the code generated by the facility in creating the senders—into the application, thus enabling the application to communicate via messages with the appropriate receivers.

Between sender 206 and receiver 204, the paradigm is message exchange, and the contract is based on transport and encoding. On both ends of this 'pipeline'—i.e., between the service consumer (not depicted) and sender 206, and between receiver 204 and service 202—the paradigm is types. A resulting technical advantage is that there is no imposition of coding or data transport style into the application code. Moreover, while a sender and receiver pair can be used to exchange messages, it will be appreciated that the sender is not required. For example, any agent that is capable of conforming to the schema can send and receive messages to and from the receiver.

Network 208 is a communications link that facilitates the transfer of electronic content between, for example, the attached computers. In one embodiment, network 208 includes the Internet. It will be appreciated that network 208 may be comprised of one or more other types of networks, such as a local area network, a wide area network, a point-to-point dial-up connection, and the like. It will also be appreciated that network 208 may not be present. For example, sender 206 and receiver 204 may both reside on the same computing system and communicate via communication mechanisms, such as, interprocess communication, remote function call, internal communication buses, etc., typically supported on the computing system.

Figure 3:
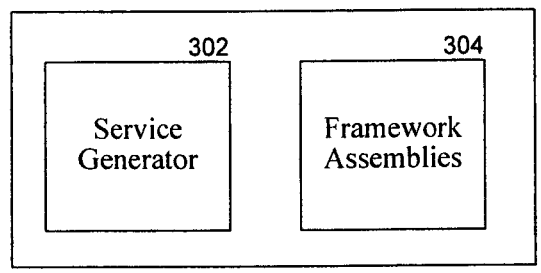
FIG. 3 is a block diagram illustrating selected components of the facility, according to one embodiment.

FIG. 3 is a block diagram illustrating selected components of the facility, according to one embodiment. As depicted, the facility includes a service generator 302 and framework assemblies 304. Service generator 302 generally functions to create the service assemblies that are deployed to the environment for consumption and service publishing. In one embodiment, service generator 302 receives as input the intermediary language assemblies that are generated by compiling the business logic and scans the input assemblies to identify the service deployment metadata attributes, and based on the attributes, generates the senders, receivers, and contracts assemblies corresponding to the business logic—i.e., service. Service generator 302 is further discussed below.

In general terms, framework assemblies 304 enable aspect containers at runtime. Framework assemblies 304 generally function as a suite of application architectural functionality that the applications can re-use. Framework assemblies 304 include the code, configuration files, tools and resources, aspects and their corresponding configuration files, and the aspect containers and their corresponding configuration files. In some embodiments, framework assemblies 304 extend and provide hooks into Microsoft® .NET Framework. As such, in some embodiments, framework assemblies 304 may refer to all or parts of Microsoft® .NET Framework. A technical advantage is that framework assemblies 304 enable many key behaviors to be defined centrally, outside of the application code. This allows service developers the flexibility to focus on the application code without having to worry about the secondary or ancillary tasks, such as, communication, caching, logging, security, validation, error reporting, etc.

In some embodiments, the facility provides a graphical user interface and configuration tools to enable a user to manage the application or service configuration. For example, the user can use the interface and tools to configure frameworks, define aspects, and define aspect containers. The facility may also provide a graphical user interface and tools to enable the user to create custom frameworks and/or aspects and to add the created frameworks and/or aspects into framework assemblies 304 for subsequent use.

The aforementioned components of the facility are only illustrative, and the facility may include other components and modules not depicted. Furthermore, the functionality provided for in the components and modules may be combined into fewer components and modules or further separated into additional components and modules.

Figure 4:
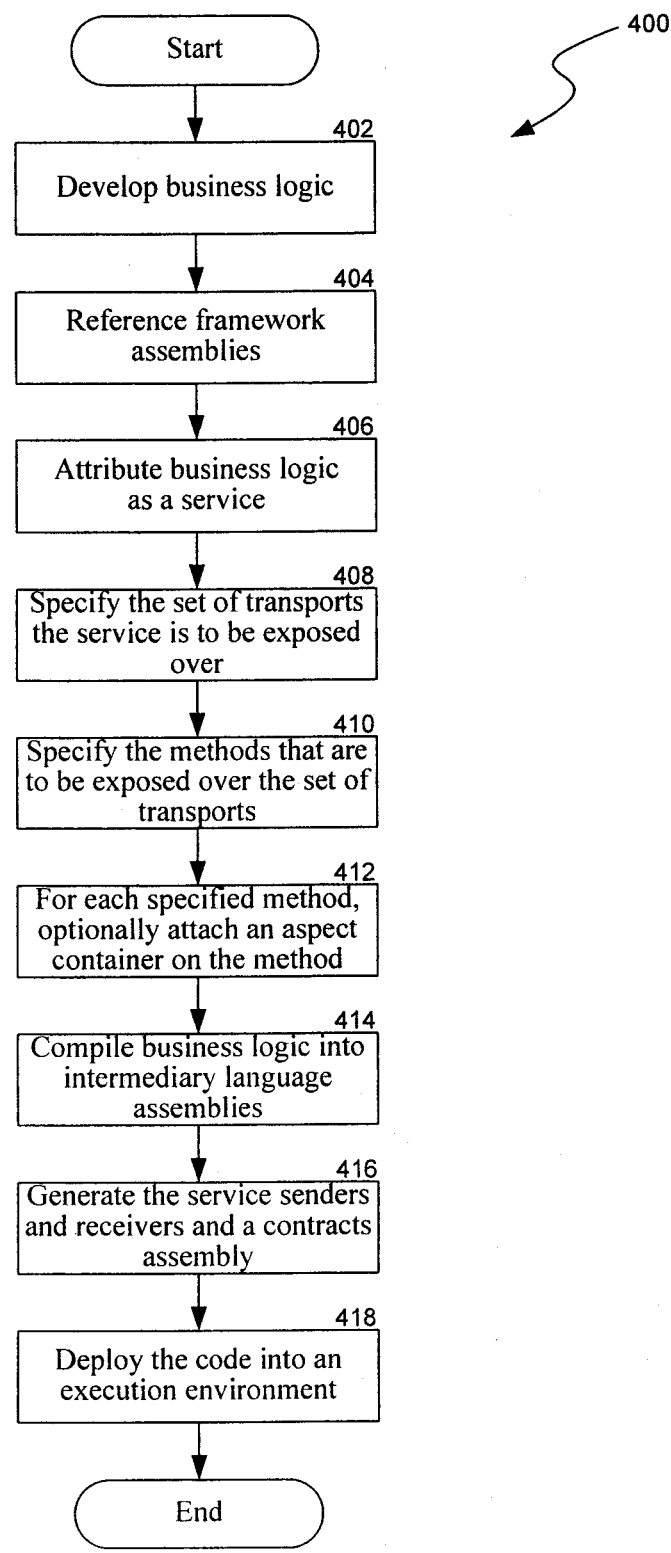
FIG. 4 illustrates a flow chart of a method by which a service developer utilizes the facility to develop and deploy a service, according to some embodiments.

FIG. 4 illustrates a flow chart of a method 400 by which a service developer utilizes the facility to develop and deploy a service, according to some embodiments. By way of example, a service developer may want to develop a calculator application that returns the sum of two variables "arg1" and "arg2," and package the calculator application and expose it as a service. Beginning at a start step, the service developer develops the logic—e.g., code—for the calculator application, at step 402. Strings 502, 504 and 506 in FIG. 5 illustrate an example code snippet of the calculator application.

At step 404, the service developer references framework assemblies 304 in the code. By referencing framework assemblies 304, the service developer is able to attach aspect containers, specify service attributes, and otherwise declaratively add functionality and behavior to the application logic. Continuing the calculator application example, string 508 in FIG. 5 illustrates an example code snippet of a reference to the framework assemblies 304. In the example code snippet, "XYZ.ACA.Services" is the name of the framework assemblies.

At step 406, the service developer attributes the business logic as a service. The attribute serves as an indication to the facility and, in particular, service generator 302, that a service is to be created from the business logic. In one embodiment, the attributes, which are metadata, are specified in the business logic using square brackets—i.e., specified between "[" and "]" brackets. Continuing the calculator application example, attribute 510 in FIG. 5 serves as an indication that the calculator application is to be generated as a service.

At step 408, the service developer specifies the set of transports the service is to be exposed over. The service developer may specify one or more transports that are available in the particular framework assemblies 304 that are referenced in the code. Continuing the calculator application example, attributes 512 and 514 in FIG. 5 serve as indications of the transports that are to be supported by the calculator service. In particular, attributes 512 and 514 are indications that the calculator service is to be exposed over "AsmxTransport" and "WseTransport," respectively.

At step 410, the service developer specifies one or more classes and/or methods that are to be exposed over the set of transports specified in step 408. In the calculator application example, the service developer specified that the method "Add" as indicated by string 504 is to be exposed over the ASMX Transport and the WSE Transport. This is indicated by attribute 516 in FIG. 5, which also serves as an indication that service generator 302 is to create a sender and receiver pair for each specified transport, and a contracts assembly for the method "Add."

One skilled in the art will appreciate that the number of transports and methods specified above are only illustrative. For example, the service developer may have specified a different number of and/or different methods that are to be exposed. Also, the service developer may have specified a different number of and/or different transports for the specified method or methods to be exposed over. The types of transports is limited by the transports supported in the framework assemblies that are referenced by the code, and for each specified transport, the facility generates a sender and receiver pair.

At step 412, the service developer may optionally attach an aspect container on the exposed class or method. The service developer may attach any aspect container that is available in the particular framework assemblies 304 that is referenced in the code. In one embodiment, the aspect container can be attached to the sender that is generated for the exposed method, the receiver that is generated for the exposed method, or both the sender and the receiver. Continuing the calculator application example, attribute 602 in FIG. 6 serves as an indication that the aspect container "CalcContainer" is to be attached to the method "Add." Moreover, attribute 602 further indicates that the scope of attachment for the aspect container as senders only, as indicated by "AspectContainerScope.SendersOnly." Thus, attribute 602 attaches the specified aspect container on the sender that is created for each specified transport. Alternatively, the service developer may have specified the scope of attachment to be receivers only—e.g., "AspectContainerScope.ReceiversOnly"—or both senders and receivers—e.g., "AspectContainerScope.Both."

The aspect container also functions as a unit of reuse of aspect sets. Each named aspect represents an instance of aspect configuration, expressing the full functionality of the underlying core framework, and is the unit of aspect behavior reuse. Moreover, different aspect containers may be attached to the sender and the receiver. Stated another way, senders and receivers may be governed by different aspect containers. Further, senders and receivers, as well as the service, may be governed by a plurality of aspect containers. Aspect containers are further discussed below.

In one embodiment, the aspect container attribute—i.e., [AspectContainer ("CalcContainer", AspectContainerScope.SendersOnly)] in the calculator application example above—is the central abstraction. The named aspect container contains one or more named aspects. It is the unit of aspect deployment and it is deployed at the class or method level. Aspect containers deployed at the class level govern all exposed methods on the class, unless overridden by a method level aspect container.

FIG. 7 illustrates an example code snippet illustrating both a class level and a method level aspect container deployment. Attribute 702 precedes string 704, which defines the class "MyClass." As such, attribute 702 serves as an indication that the aspect container "Container1" is a class level aspect container, and is to govern all the exposed methods in the class "MyClass," unless overridden by an aspect container directly deployed on an exposed method in the class. Attribute 706 serves as an indication that the aspect container "Container2" is to be attached to the method "GetMyData," which is an exposed method in the class "MyClass." Thus, aspect container "Container2" is a method level aspect container, which overrides or takes precedent over the class level aspect container "Container1." As a result, class level aspect container "Container1" is to be attached to all exposed methods in the class "MyClass" except method "GetMyData."

Referring again to method 400, at step 414, the service developer compiles the business logic, which includes the attributes for the services and aspects, into intermediary language assemblies, such as, by way of example, libraries, dynamic link libraries, assemblies, object files, etc. At step 416, the service developer uses the facility to generate the service senders and receivers and a contracts assembly from the intermediary language assemblies.

Figure 8:
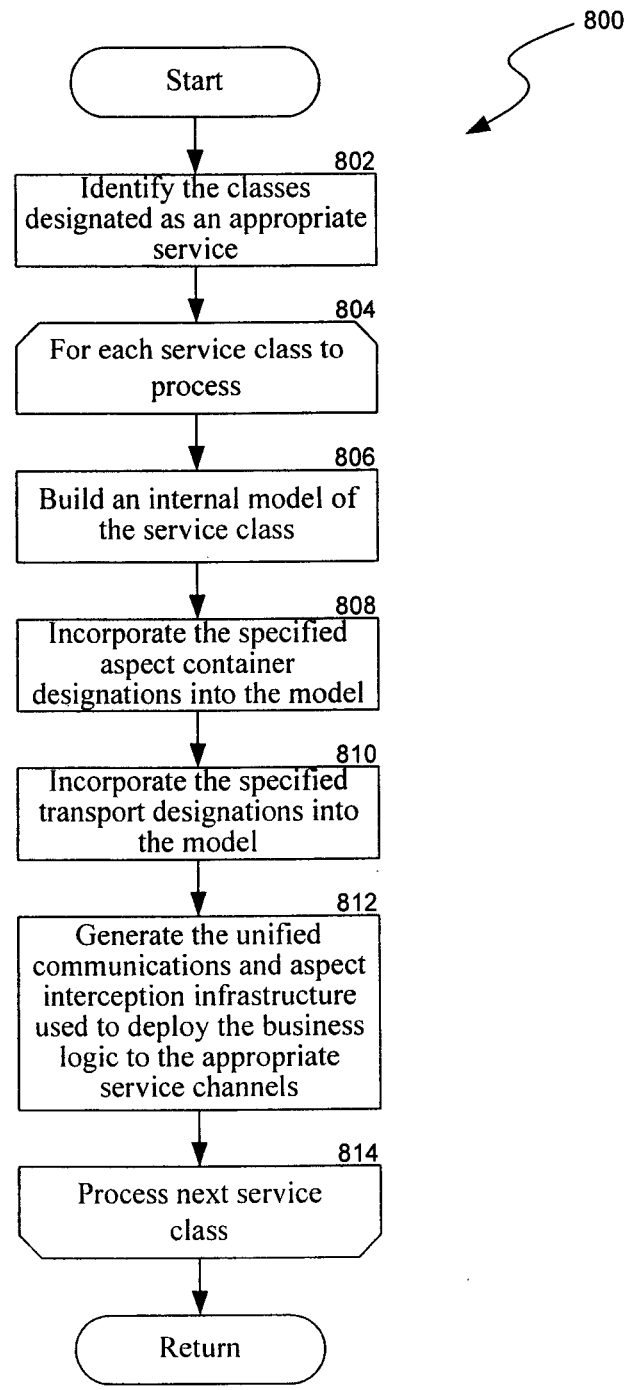
FIG. 8 illustrates a flow chart of a method by which the facility compiles the intermediary language assemblies, according to some embodiments.

FIG. 8 illustrates a flow chart of a method 800 by which the facility compiles the intermediary language assemblies, according to some embodiments. In particular, service generator 302 utilizes framework assemblies 304 to generate the service senders and receivers and the contracts assembly. During a start step, the intermediary language assemblies generated from the business logic is input to service generator 302.

At step 802, service generator 302 scans through the assemblies looking for classes that have been designated as services. Continuing the calculator application example, service generator 302 scans through the assemblies looking for classes that have been designated as [ACAService]. Then, for each of the service classes (step 804), service generator 302 performs steps 806 to 812. At step 806, service generator 302 builds an internal model of the class by reflecting over its structure and capturing all the details of the interfaces of the service methods. The model eliminates the 'noise' or unnecessary details that are unimportant or not necessary for service generator 302 to create the senders, receivers, and contracts. For example, a class may include three methods, method 1, method 2, and method 3, of which only method 2 is designated as a method to be exposed as a service. In this instance, the model will include method 2, but not methods 1 and 3. In one embodiment, service generator 302 builds the model in internal memory.

At step 808, service generator 302 incorporates the specified aspect containers—e.g., [AspectContainer]—into the internal model. At step 810, service generator 302 incorporates the specified transport designations—e.g., [*Transport]—into the internal model. Continuing the aforementioned calculator application example, service generator 302 incorporates [AspectContainer ("CalcContainer", AspectContainerScope.SendersOnly)] and [AsmxTransport] and [WseTransport] into the internal model.

At step 812, service generator 302 generates the unified communications and aspect interception infrastructure used to deploy the business logic to the appropriate service channels—i.e., transports. The aspect interception infrastructure ensures that the attached aspects are called and processed prior to the business logic being processed as well as after the business logic is processed. In one embodiment, the aspect interception infrastructure is implemented as code that is included in the sender and/or receiver to which the aspects are attached. Continuing the calculator application example, service generator 302 produces the following:

An ASMX Sender, which is enhanced with the aspect interception mechanism for the "CalcContainer" AspectContainer. The ASMX Sender is used to invoke the service functionality over the ASMX transport. It calls the ASMX Receiver.

An ASMX Receiver, which is used to receive the message from the ASMX Sender. It forwards the call on to the actual business logic—i.e., the calculator application method "Add."

A WSE Sender, which is enhanced with the aspect interception mechanism for the "CalcContainer" AspectContainer. The WSE Sender is used to invoke the service functionality over the WSE transport. It calls the WSE Receiver.

A WSE Receiver, which is used to receive the message from the WSE Sender. It forwards the call on to the actual business logic—i.e., the calculator application method "Add."

The business logic packaged as a service.

A contracts assembly, which specifies the data types for the data used in the actual business logic—i.e., the calculator application method "Add."

Referring again to method 400, at step 418, the service developer deploys the code into an execution environment. The senders and the contracts produced by service generator 302 are typically deployed for consumption on clients, while the receivers and the service are deployed on servers coupled to the clients. Furthermore, if a sender is enhanced with aspects through the attachment of an aspect container, the appropriate framework assembly—e.g., framework assemblies 304—including any necessary configuration information for the aspect container and the aspects, are also deployed with the client. Once deployed, the services are ready for consumption by service consumers. Continuing the calculator application example, the ASMX Sender, the WSE Sender, the contracts assembly, the aspect container "CalcContainer", and the framework assembly "XYZ.ACA.Services," including the necessary configuration files for the aspect container "CalcContainer" and the configuration files for the aspects contained in "CalcContainer," may be deployed on one or more clients for consumption by service consumers, while the ASMX Receiver, the WSE Receiver, and the service may be deployed on one or more servers coupled to these clients.

One skilled in the art will appreciate that, for this and other methods and processes disclosed herein, the functions performed in the exemplary flow charts may be implemented in differing order. Furthermore, the steps outlined in the flow charts are only exemplary, and some of the steps may be optional, combined into fewer steps, or expanded into additional steps without detracting from the essence of the invention.

Figure 9:
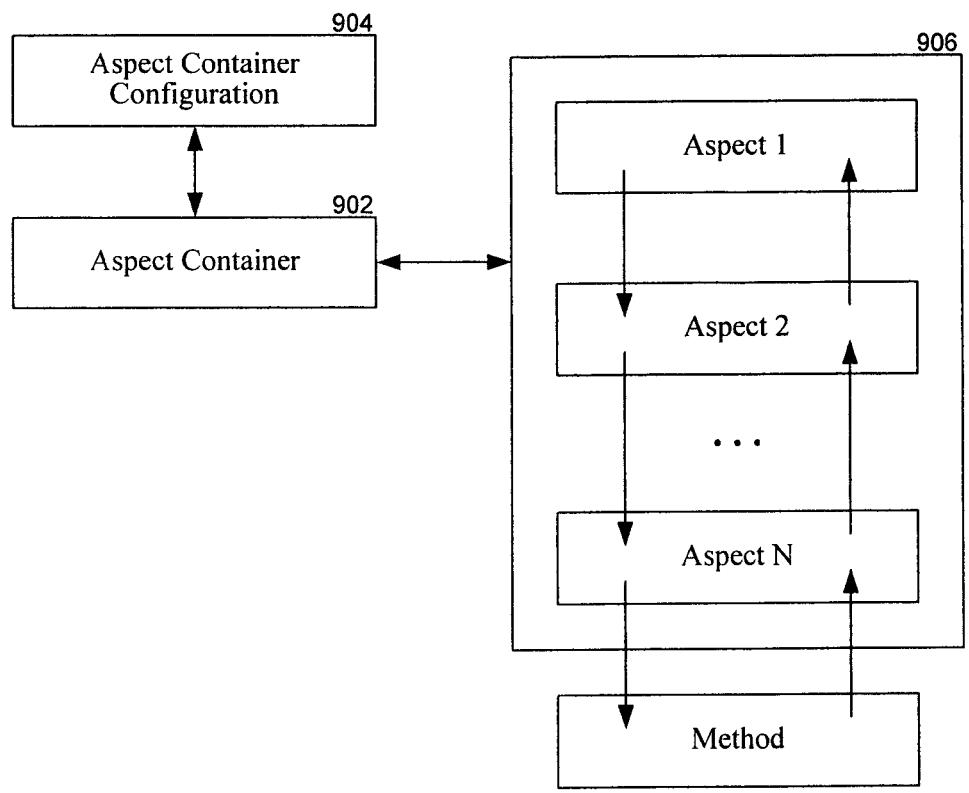
FIG. 9 is a block diagram illustrating an example aspect container.

FIG. 9 is a block diagram illustrating an example aspect container. As depicted, an aspect container 902 is coupled to an aspect container configuration 904 and a plurality of aspects 906. Aspect container 902 generally functions to create an instance of the plurality of aspects 906 as specified in aspect container configuration 904. Aspect container configuration 904 generally functions as a repository for the information used by aspect container 902 to generate an instance of the aspects. For example and as depicted in FIG. 9, aspect container 904 may include a list of the aspects, "Aspect 1" through "Aspect N," in sequence. Each aspect contains the logic to perform a function that typically apply uniformly across a variety of usage instances, such as, by way of example, auditing (e.g., capturing a log of the service activity), instrumentation (e.g., capturing the service performance information), security (e.g., applying authorization policies), caching (e.g., defining the caching behavior of the services), exception handling (e.g., performing a defined behavior in the event of service failure or exception), and validation (e.g., defining the validity of data and applying the validation rules). One skilled in the art will appreciate that an aspect container can create an instance of zero, one or more aspects as specified by its aspect configuration file.

In one embodiment, an aspect container is different from the other aspect containers only in name. Other than reading in or inputting the contents of a different aspect container configuration file, as indicated by the name of a particular aspect container, all aspect containers execute or perform the same logic to create the instances of the aspects as specified by the input configuration file. In this manner, aspect containers organize and coordinate the aspects, and build a managed chain of aspects to 'preamble' and 'postamble' the application or business logic—e.g., class or method.

As depicted in FIG. 9, the plurality of aspects 906 includes a chain of n aspects, "Aspect 1" through "Aspect N." The order of the aspects in the chain and each aspect's internal state is retrieved from a respective configuration file (not depicted). In operation, each aspect in the chain of aspects has a chance to execute both before and after the call to the class or method. For example, if the plurality of aspects 906 is attached to a sender, the n aspects—i.e., "Aspect 1" through "Aspect N"—execute in sequence before a call to the service is made utilizing the transport incorporated in the sender. Upon return from the service, "Aspect N" through "Aspect 1" executes in reverse sequence. Alternatively, if the plurality of aspects 906 is attached to a receiver, "Aspect 1" through "Aspect N" executes in sequence before a call to the service. Upon return from the service, "Aspect N" through "Aspect 1" executes in reverse sequence before returning to the sender that originally invoked the service.

In some embodiments, the facility provides a graphical user interface and tools for configuring frameworks, aspects, and aspect containers. In one embodiment, frameworks that are provided in framework assemblies, such as framework assemblies 304, need to be configured prior to their use. Assuming that framework assemblies 304 provides a caching framework, a service developer may need to define characteristics of the caching framework, such as a caching storage type (e.g., database), instance name (e.g. applications can have multiple instances), memory threshold (e.g., the number of items in cache), polling interval (e.g., how often to poll the cache of expired items), scavenging range (e.g., how many items to remove from cache in case a specified threshold has been reached), etc. In like manner, the service developer can define the characteristics for the other frameworks, such as an auditing framework, an instrumentation framework, a security framework, an exception handling framework, a validation framework, and any other provided framework by specifying the general characteristics appropriate for the particular framework.

Similarly, aspects and aspect containers also need to be configured prior to their use. Assuming that the service developer wants to define a caching aspect, the service developer may need to (1) define an aspect, (2) specify the aspect's type as a caching aspect, and (3) define the necessary settings for this type of caching aspect, such as a cache instance that is to be used, an expiration strategy, a purging priority in the instance the cache becomes too large, etc. In one embodiment, the facility maintains the configuration information for the aspect in a configuration file associated with the configured aspect. In like manner, the service developer can configure other aspects. Having configured one or more aspects, the service developer can define an aspect container and add aspects into the aspect container. In one embodiment, the name of the aspect container needs to match the container name used in the application or business code. Referring again to the calculator application example, the service developer needs to name the aspect container as "CalcContainer."

Figure 10:
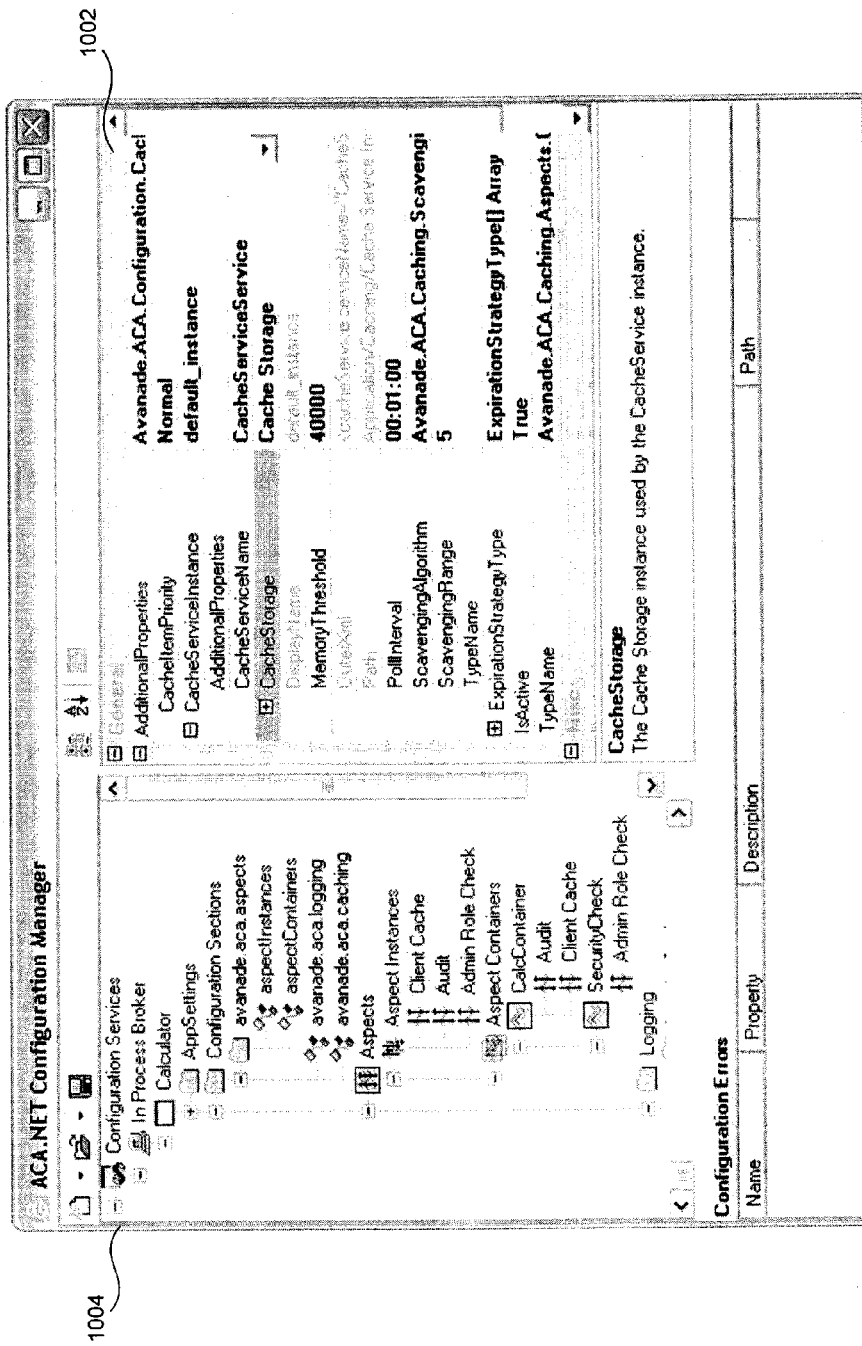
FIG. 10 is a display diagram showing a portion of an example graphical user interface suitable for configuring and administering frameworks, aspects, and aspect containers.

FIG. 10 is a display diagram showing a portion of an example graphical user interface suitable for configuring and administering frameworks, aspects, and aspect containers. A window 1002 displays configuration information regarding the caching framework and allows a user to modify the configuration information by selecting a displayed characteristic using a pointing device such as a mouse, and providing the necessary information. Window 1002 may provide the user the ability to enter the information by selecting one or more items from a drop-down or pop-up window. A window 1004 displays the aspects and aspect containers defined in an application "Calculator" in an expandable tree structure. In this example, as depicted, the available aspects are "Client Cache," "Audit," and "Admin Role Check," and two aspect containers, "CalcContainer" and "SecurityCheck," are configured. The aspect container "CalcContainer" contains the aspects "Audit" and "Client Cache" in that sequence, and the aspect container "SecurityCheck" contains the aspect "Admin Role Check." Window 1004 allows the user the ability to select aspects and aspect containers in order to add aspects into and remove aspects out of aspect containers. For example, the user can add an aspect to an aspect container by using a pointing device, such as a mouse, and selecting an aspect or multiple aspects and manipulating the selected aspects to place the selected aspects into the aspect container. The user can likewise remove an aspect or multiple aspects by selecting the aspects and removing the aspects out of the aspect container. Window 1004 also displays the configuration information for an aspect or aspect container in response to its user selecting the aspect or aspect container. For example, the configuration information may be displayed in window 1002 or another window—e.g., a pop-up window.

Once an aspect container is added to the code, the specification of the particular aspects associated with that container may be accomplished through a graphical user interface, such as the user interface illustrated in FIG. 10. A technical advantage to externalizing the application of particular aspects to a named aspect container is that there is an unprecedented level of control over the full suite of aspect behaviors. For example, what was once a laborious and often inconsistently implemented coding task is now a matter of policy, which can be controlled by architects and/or administrators.

Another technical advantage is that aspects and aspect containers allow developers to be shielded from those ever changing business requirements. For example, the business logic does not care that it is being audited or that the return value for a particular method needs to be cached and persisted to a database to survive reboots. The business logic developer does not need to write this code anymore since the functionality can now be added outside of the actual code through external configuration.

Still another technical advantage is that aspects and aspect containers enable applications to be built or developed much faster since a significant amount of application functionality can be simply expressed though configuration instead of through hand-coding. This also adds quality to the applications because many tasks that once depended on custom code to manipulate aspect-like frameworks, such as authorization, is now implemented through tested and proven aspects. Further, aspects and aspect containers increase the agility of the applications because many important facets of application behavior are externalized and configurable at or after deployment time.

Figure 11:
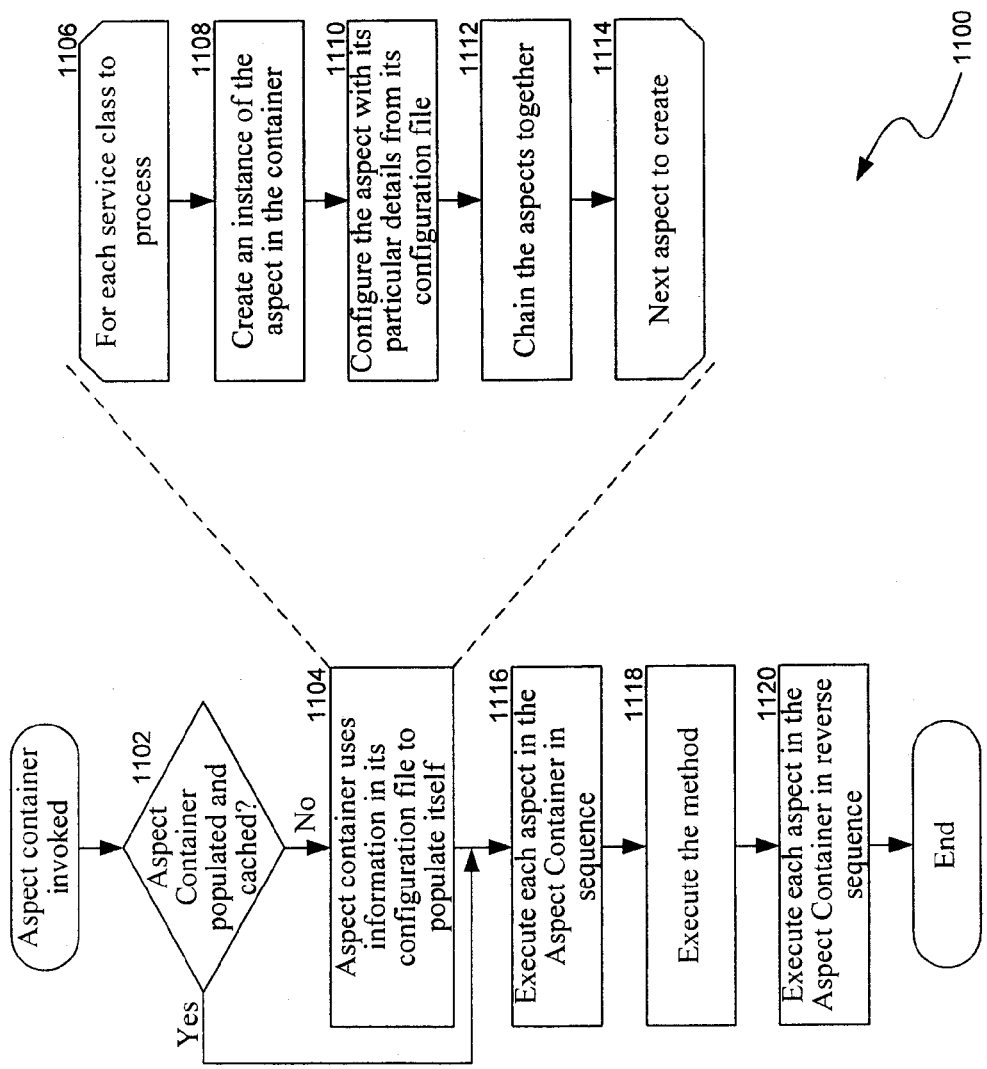
FIG. 11 illustrates a flow chart of a method by which the facility generates an aspect container at runtime, according to some embodiments.

FIG. 11 illustrates a flow chart of a method 1100 by which the facility generates an aspect container at runtime, according to some embodiments. By way of example, an aspect container may have been deployed into an execution environment as part of a service sender or a service receiver. When the code—i.e., sender or receiver—is deployed, each aspect container instance is different from the others only in the name of the container that is provided, and the actual definition of the contents of the container and the particular configuration of each aspect in each container is expressed externally in a file, such as an XML file. Then, when each aspect container is initially invoked by the generated interception mechanism, the aspect container, at step 1102, checks to determine if it is populated and cached in memory. If the aspect container determines that it had not previously populated itself—i.e., created an instance of itself—and cached the instance in memory, then, at step 1104, the aspect container reads in the configuration information from its corresponding configuration file and uses the configuration information to populate itself.

Steps 1106 through 1114 illustrate one embodiment of a method by which the aspect container populates itself. At step 1106, the aspect container identifies the aspects that need to be created. For each aspect that needs to be created, the aspect container performs steps 1108 to 1112. At step 1108, the aspect container uses contents—i.e., aspect definitions, etc.—of the framework assemblies and creates an instance of the aspect and places it in the container—e.g., within itself. At step 1110, the aspect container configures the aspect instance according to the configuration information and details contained in the aspect's configuration file. At step 1112, the aspect container chains the aspect instances together in a sequence. The aspect container retrieves the sequence information from its configuration file. Once the aspect container finishes populating itself, the aspect container caches its contents—i.e., the created instances of the aspects—in memory. By caching itself in memory, the aspect container provides efficiency in subsequent calls. For example, the aspect container does not have to populate itself if its instance is cached in memory.

If, at step 1102, the aspect container determines that it had previously populated and cached itself, or subsequent to populating itself, the aspect container executes each aspect in sequence, at step 1116. At step 1118, the method—e.g., the actual service business functionality—is executed. In one embodiment, the last aspect in the chain of aspects executes and then initiates a call to the method. Subsequent to the method executing, the aspect container executes the chain of aspects in reverse sequence, at step 1120.

Figure 12:
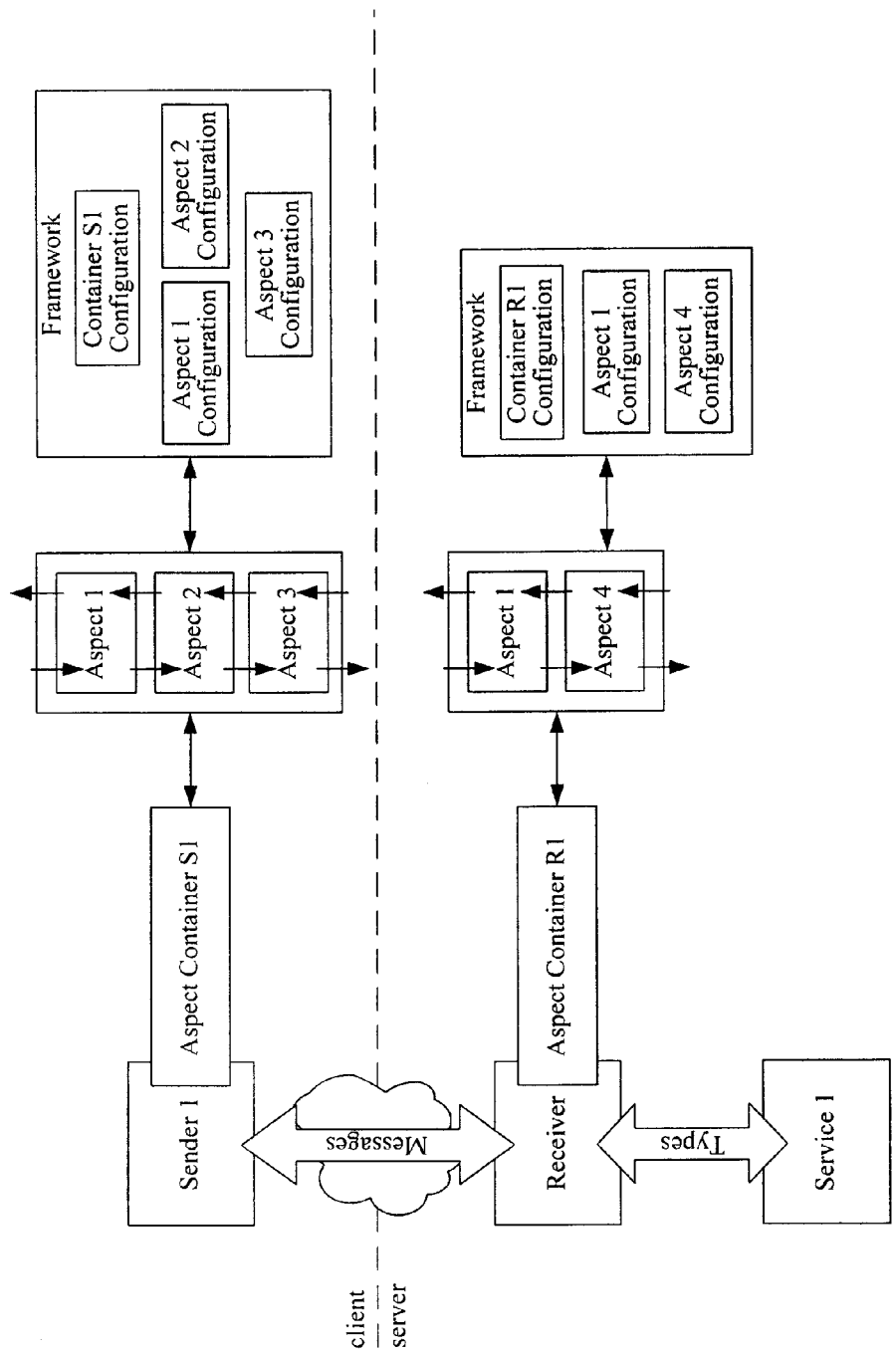
FIG. 12 is a block diagram illustrating aspect containers attached to both a sender and a receiver, according to one embodiment.

FIG. 12 is a block diagram illustrating aspect containers attached to a sender and a receiver. In particular, a sender "Sender 1" is deployed on a client, and a receiver "Receiver 1" and a service "Service 1" are deployed on a server. An aspect container "Aspect Container S1" is attached to "Sender 1," and "Aspect Container S1" is comprised of a chain of three aspects, "Aspect 1," "Aspect 2," and "Aspect 3." Thus, when initially invoked, "Aspect Container S1" populates itself by reading in its configuration contained in, for example, "Container S1 Configuration" and creating an instance of the chain of aspects. "Aspect Container S1" also configures each aspect instance in the chain with its particular details contained in, for example, "Aspect 1 Configuration," "Aspect 2 Configuration," and "Aspect 3 Configuration." Subsequent to populating itself, control passes through "Aspect Container S1," which executes "Aspect 1," "Aspect 2," and "Aspect 3" in sequence, then executes the actual service functionality, "Service 1," via a call to "Receiver 1." Upon receiving a response from "Service 1" via "Receiver 1," "Aspect Container S1" executes each aspect in reverse sequence—e.g., "Aspect 3" then "Aspect 2" then "Aspect 1." In one embodiment, the configuration files—e.g., "Container S1 Configuration," "Aspect 1 Configuration," "Aspect 2 Configuration," and "Aspect 3 Configuration"—are deployed on the client.

On the server, an aspect container "Aspect Container R1" is attached to "Receiver 1," and "Aspect Container R1" is comprised of a chain of two aspects, "Aspect 1" and "Aspect 4." Thus, when initially invoked, for example, by receiving a message from "Sender 1," "Aspect Container R1" populates itself by reading in its configuration contained in, for example, "Container R1 Configuration" and creating an instance of the chain of aspects. "Aspect Container R1" also configures each aspect instance in the chain with its particular details contained in, for example, "Aspect 1 Configuration" and "Aspect 4 Configuration." Subsequent to populating itself, control passes through "Aspect Container R1," which executes "Aspect 1" and "Aspect 4" in sequence, then executes the actual service functionality, "Service 1." Upon receiving a response from "Service 1," "Aspect Container R1" executes each aspect in reverse sequence—i.e., "Aspect 4" then "Aspect 1." In one embodiment, the configuration files—i.e., "Container R1 Configuration," "Aspect 1 Configuration," and "Aspect 4 Configuration"—are deployed on the server as part of the framework assemblies, "Framework."

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

These and other changes can be made to the invention in light of the above Detailed Description. While the above description details certain embodiments of the invention and describes the best mode contemplated, no matter how detailed the above appears in text, the invention can be practiced in many ways. Details of the architecture may vary considerably in its implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

We claim:

1. A non-transitory computer-readable storage medium whose contents cause a computing device to create an aspect container, by performing a method comprising:
   reading configuration information from a configuration file corresponding to an aspect container, the configuration information specifying a sequence of one or more aspects, wherein the aspect container is a unit of aspect deployment, and wherein the aspect is functional areas that apply uniformly across a variety of usage instances;
   for each aspect in the sequence:
      creating an instance of each aspect in the aspect container;
      configuring the instance of each aspect with details from its respective configuration file; and
      sequencing the instances of the aspects together in sequence, wherein a last aspect in the sequence of aspects is operable to call a method, and each aspect in the sequence of aspects is exercised in sequence before the call to the method, and each aspect in the sequence of aspects is exercised in reverse sequence alter the call to the method.

2. The non-transitory computer-readable storage medium of claim 1, wherein the configuration file is an extensible markup language (XML) file.

3. The non-transitory computer-readable storage medium or claim 1, wherein the aspect container contains logic to read its corresponding configuration file and to create instances of the sequence of aspects.

4. The non-transitory computer-readable storage medium of claim 1, wherein the aspect container is operable to be deployed at a class level, such that the aspect container governs all exposed methods in the class.

5. The non-transitory computer-readable storage medium of claim 1, wherein the aspect container is operable to be deployed at a method level, such that the aspect container governs the method.

6. The non-transitory computer-readable storage medium of claim 1, wherein the aspect container is attached to a sender.

7. The non-transitory computer-readable storage medium of claim 1. wherein the aspect container is attached to a receiver.

8. The non-transitory computer-readable storage medium of claim 1, wherein the aspect container is declared as attributes in an application.

9. The non-transitory computer-readable storage medium of claim 1 further comprising contents that cause the computing device to create the aspect container, by performing a method comprising caching the aspect container in memory.

10. A computer-implemented method for populating an instance of an aspect container, the method comprising:
  responsive to being initially invoked, creating an instance of an aspect container, reading in configuration information specifying a sequence of one or more aspects from a configuration tile corresponding to the aspect container, and populating the instance of the aspect container according to the configuration information by:
    creating instances of the aspects in the sequence of aspects:
    configuring each aspect instance with its particular details: and
    chaining each aspect instance together, wherein each aspect instance in the sequence of aspects has a chance to exercise itself in sequence before a call to a method. and each aspect instance in the sequence of aspects has a chance to exercise itself in reverse sequence alter the call to the method.

11. The method of claim 10, wherein the configuration file is an XML file.

12. The method of claim 10, wherein the particular details for each aspect instance is read from a configuration file corresponding to the aspect.

13. The method of claim 10, wherein the aspect is an auditing function.

14. The method of claim 10, wherein the aspect is an instrumentation function.

15. The method of claim 10, wherein the aspect is a security function.

16. The method of claim 10, wherein the aspect is a caching function.

17. The method of claim 10, wherein the aspect is an exception handling. function.

18. The method of claim 10, wherein the aspect is a validation function.

19. The method of claim 10, wherein the aspect is a function that applies uniformly across a variety of usage instances.

20. The method of claim 10, wherein an aspect instance at the end of the chain is operable to call a method, and each aspect instance in the chain has a chance to exercise itself in sequence before the call to the method, and each aspect instance in the chain has a chance to exercise itself in reverse sequence after the call to the method.

21. A non-transitory computer-readable storage medium having an aspect container stored thereon, wherein the aspect container, in response to execution by a computing device, causes the computing device to:
  create an instance of the aspect container;
  read configuration information specifying a sequence of one or more aspects from an aspect container configuration tile corresponding to the aspect container;
  generate an instance of each aspect in the sequence in the aspect container instance;
  configure each aspect instance with its configuration information from an aspect configuration file corresponding to the aspect; and
  chain the aspect instances according to the specified sequence,
  wherein the chain of aspect instances preamble and postamble activities of a class or method.

22. The non-transitory computer-readable storage medium of claim 21, wherein the aspect container configuration file has a same name as the aspect container.

23. The non-transitory computer-readable storage medium of claim 21, wherein the aspect container configuration file is an XML 24. The non-transitory computer-readable storage medium of claim 21, wherein the aspect configuration file is an XML 25. The non-transitory computer-readable storage medium of claim 21, wherein the aspect container instance is operable to be deployed at a class level, such that the aspect container governs all exposed methods in the class.

26. The non-transitory computer-readable storage medium of claim 21, wherein the aspect container instance is operable to be deployed at a method level, such that the aspect container governs the method.

27. The non-transitory computer-readable storage medium of claim 21, wherein the aspect container instance is attached to a sender.

28. The non-transitory computer-readable storage medium of claim 21, wherein the aspect container instance is attached to a receiver.

29. The non-transitory computer-readable storage medium of claim 21, wherein the aspect container is declared as attributes in an application.

30. The non-transitory computer-readable storage medium of claim 21, wherein the aspect container further causes the computing device to cache the aspect container instance in memory.

31. The non-transitory computer-readable storage medium of claim 21, wherein the aspect container is configurable subsequent to deployment within an application.

32. The non-transitory computer-readable storage medium of claim 21, wherein the aspect container is configurable via a graphical user interface.

33. The non-transitory computer-readable storage medium of claim 21, wherein the chain of aspect instances preamble activities of the class or method in the specified sequence, and wherein the chain of aspect instances postamble activities of the class or method in a reverse sequence of the specified sequence.

* * * * *

UNITED STATES PATENT AND TRADEMARK OFFICE
CERTIFICATE OF CORRECTION

PATENT NO. : 8,504,982 B2  
APPLICATION NO. : 12/651971  
DATED : August 6, 2013  
INVENTOR(S) : M. D. Joe et al.

Page 1 of 1

It is certified that error appears in the above-identified patent and that said Letters Patent is hereby corrected as shown below:

In the Claims

| COLUMN | LINE | ERROR |
|---|---|---|
| 16 (Claim 1, | 67 line 21) | "alter" should read --after-- |
| 17 (Claim 7, | 20 line 2) | delete "." and insert --,-- |
| 17 (Claim 10, | 34 line 6) | "tile" should read --file-- |
| 17 (Claim 10, | 40 line 12) | "details:" should read --details;-- |
| 17 (Claim 10, | 44 line 16) | delete "." and insert -- ,-- |
| 17 (Claim 10, | 46 line 18) | "alter" should read --after-- |
| 17 (Claim 17, | 61 line 2) | delete "." and insert --,-- |
| 18 (Claim 23, | 29 line 3) | after "XML" insert --file.-- |
| 18 (Claim 24, | 31 line 2) | after "XML" insert --file.-- |

Signed and Sealed this  
Fifteenth Day of July, 2014

Michelle K. Lee  
*Deputy Director of the United States Patent and Trademark Office*